No. 648,382. Patented May 1, 1900.
J. R. BLAKESLEE.
SAFETY DEVICE FOR BOLT HEADING MACHINES.
(Application filed June 12, 1899.)
(No Model.)

Witnesses,
H. D. Bogard
R. S. Giffin

Inventor,
John R. Blakeslee
per Geo. W. Tibbitts,
Attorney.

THE NORRIS PETERS CO., PHOTO-LITHO., WASHINGTON, D. C.

UNITED STATES PATENT OFFICE.

JOHN R. BLAKESLEE, OF CLEVELAND, OHIO.

SAFETY DEVICE FOR BOLT-HEADING MACHINES.

SPECIFICATION forming part of Letters Patent No. 648,382, dated May 1, 1900.

Application filed June 12, 1899. Serial No. 720,322. (No model.)

*To all whom it may concern:*

Be it known that I, JOHN R. BLAKESLEE, a citizen of the United States of America, and a resident of Cleveland, in the county of Cuyahoga, State of Ohio, have invented certain new and useful Improvements in Safety Devices for Bolt-Heading Machines, of which the following is a specification.

This invention relates to a safety device for bolt-heading machines; and it consists of a new construction and adaptation of a safety-pitman connecting the crank-operating shaft with the gripping-die mechanism.

The object of the invention is to provide against the danger of breakage or damage to the machinery by reason of the displacement of a blank or the accidental falling of any other object between the gripping-dies.

The nature and operations of this invention will fully appear from the subjoined description and are illustrated in the accompanying drawings, in which—

Figure 1:
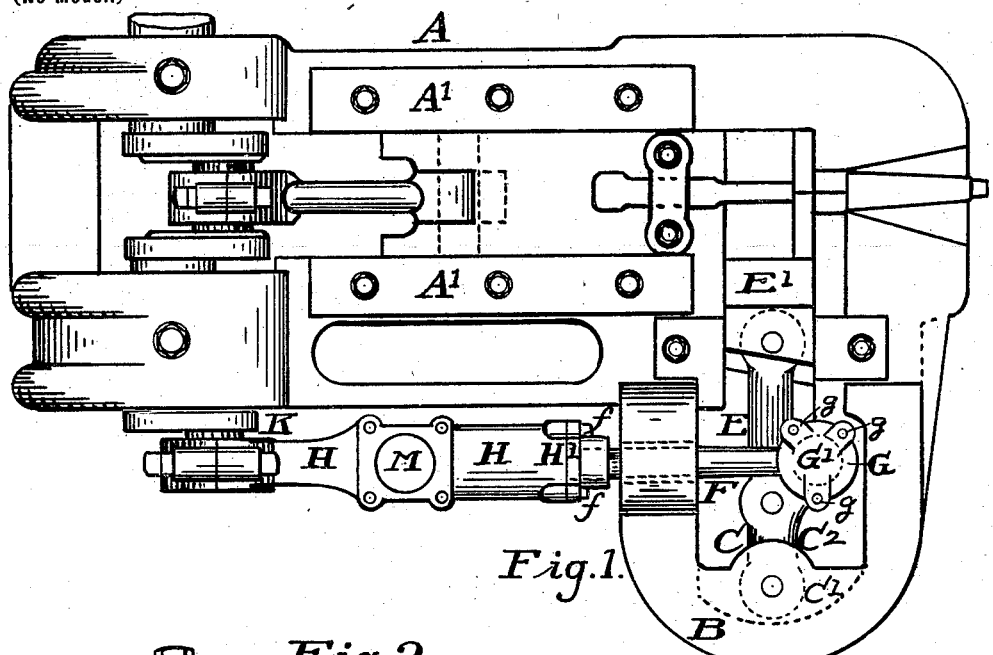
Figure 2:
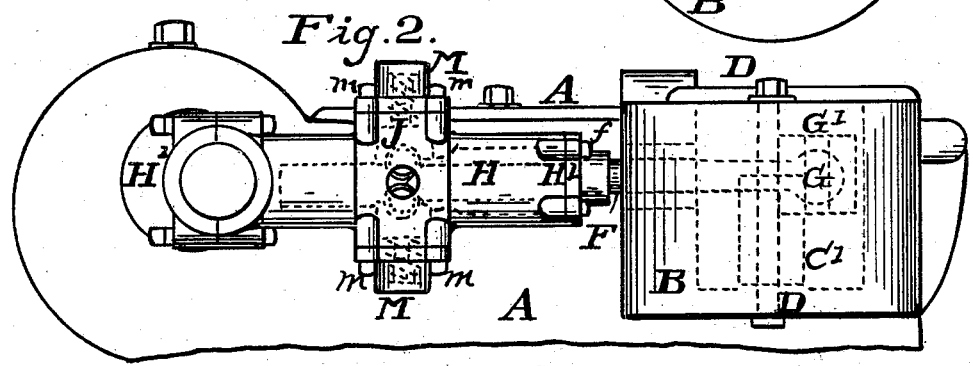
Figure 3:
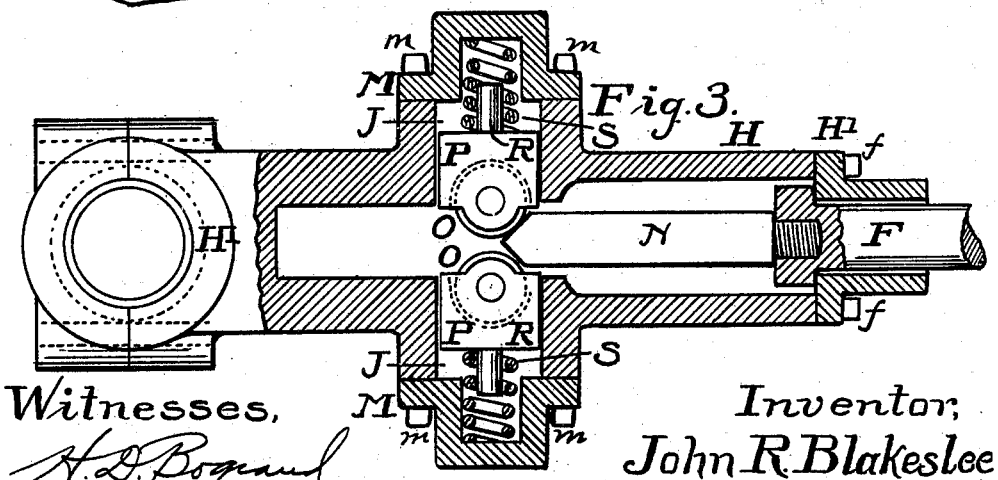

Figure 1 is a top or plan view of a bolt-heading machine having my new safety-pitman attached. Fig. 2 is a side elevation of the same. Fig. 3 is an enlarged sectional view of the new pitman.

Like letters of reference indicate like parts throughout the several views.

A represents the bed and supporting-frame for the operating mechanisms of the machine.

A' A' are the ways or slides for the movable die-holding heads.

B is a chambered projection on the bed A, in which is supported the knuckle-joint mechanism which operates the movable gripping-dies.

C is one of the members of the joint, consisting of a hollow or tubular post C', having arms C² C². This member is supported on a pin or bolt D, passing through said post and fixed in the rounded portion of said chamber.

E is a link connecting the arm C² with the movable die-head E'. The arm C³ contains a ball-joint socket for connection with the rod F, comprising part of the new pitman.

G is a ball on the end of the rod F, which is held in the socket by the cap G', secured by the screws $g$.

This description forms part of the mechanism contained in my application, Serial No. 697,582, filed November 28, 1898, and does not form a part of the improvement for which a patent is asked in this application, but is introduced to show the connection of this new improvement with the same.

This new improvement consists in the peculiar construction of the pitman which operates in conjunction with the said knuckle-joint, whereby the safety device is self-operating and self-setting for continued and uninterrupted operations of the machine. This pitman consists of a hollow portion H, having an eye H', which connects it with the crank K on the driving-shaft I. J J are two transverse chambers made one on the upper and one on the under side of said pitman and about midway of its length. Said transverse chambers are covered and closed by chambered caps M M, secured by bolts $m\, m$. The rod F is inserted in the open end of the pitman and is held therein by a ring and sleeve H'', secured by screws $f\, f$.

N is a flat bar secured in the head of the rod F and has its opposite end corners beveled off at an angle of about forty-five degrees.

O O are rollers journaled in the blocks P P, contained in the transverse chambers J J. The rollers bear against the beveled corners of the said bar N.

R R are pins or lugs on the blocks P P, and S S are springs placed on said pins and bearing against the blocks and the caps M M. The tension of said springs is great enough to offer sufficient resistance against the bar N to operate and hold the gripping-dies, but will yield against any undue pressure, as when any obstruction intervenes between the gripping-dies.

From the foregoing it will be seen that the workings and advantages of this improvement are that all liability to injury to the machine by reason of obstructions in the dies is obviated. A small obstruction will cause the springs to spread by a little movement of the bar. A large obstruction does not spread the springs any farther; but the bar is pushed in between the rollers, allowing the pitman to complete its stroke without operating the dies. Then when the pitman makes the returning part of its stroke the bar is withdrawn and the pressure of the springs resets the blocks and rollers against the end of the bar. Thus the pitman is made automatic in its movements for obviating the dangers of obstructions and for resetting the blocks and rollers.

Having described my invention, what I claim is—

1. The combination with the hollow pitman H and the rod F supported in one end thereof, and connected with the gripping-die mechanism; of the bar N, attached to the inner end of said rod F, and having beveled pointed end, the spring-actuated blocks P P, having rollers O O, and supported in the transverse chambers J J of said hollow pitman, the arrangement being such that said blocks will spread against undue pressure from said bar N, as and for the purpose specified.

2. In a machine for heading bolts, provided with heading and gripping-die mechanisms, the combination with the driving crank-shaft; of the pitman consisting of the hollow part H, having the transverse chambers J J, caps M M closing said chambers, blocks P P supported in said chambers, and provided with the rollers O O, springs S S in the caps M M and bearing against said blocks, the rod F held in the end of pitman H, and connected with the gripping-die-operating mechanism, and the bar N attached to the rod F and having the beveled corners bearing against the rollers O O, and adapted to spread said blocks against undue pressure, and to reset them by withdrawal by the return half-stroke of the pitman, substantially as and for the purpose set forth.

Signed by me at Cleveland, Ohio, this 8th day of June, 1899.

JOHN R. BLAKESLEE.

Witnesses:
GEO. W. TIBBITTS,
M. MILLARD.